United States Patent
Zhou et al.

(10) Patent No.: US 12,555,847 B2
(45) Date of Patent: Feb. 17, 2026

(54) BATTERY PACK

(71) Applicant: CALB Co., Ltd., Jiangsu (CN)

(72) Inventors: Pengfei Zhou, Changzhou (CN); Tinglu Yan, Changzhou (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 778 days.

(21) Appl. No.: 17/855,800

(22) Filed: Jul. 1, 2022

(65) Prior Publication Data
US 2023/0335833 A1 Oct. 19, 2023

(30) Foreign Application Priority Data
Apr. 15, 2022 (CN) .......................... 202210399830.0

(51) Int. Cl.
| | |
|---|---|
| *H01M 10/658* | (2014.01) |
| *H01M 10/613* | (2014.01) |
| *H01M 10/653* | (2014.01) |
| *H01M 10/6568* | (2014.01) |
| *H01M 10/643* | (2014.01) |
| *H01M 10/6555* | (2014.01) |
| *H01M 10/6557* | (2014.01) |
| *H01M 10/6567* | (2014.01) |

(Continued)

(52) U.S. Cl.
CPC ....... *H01M 10/658* (2015.04); *H01M 10/613* (2015.04); *H01M 10/653* (2015.04); *H01M 10/6568* (2015.04); *H01M 10/643* (2015.04); *H01M 10/6555* (2015.04); *H01M 10/6557* (2015.04); *H01M 10/6567* (2015.04); *H01M 10/659* (2015.04); *H01M 50/213* (2021.01); *H01M 50/264* (2021.01); *Y02E 60/10* (2013.01)

(58) Field of Classification Search
CPC ............. H01M 10/613; H01M 10/643; H01M 10/653; H01M 10/6555; H01M 10/6557; H01M 10/6567; H01M 10/6568; H01M 10/658; H01M 10/659; H01M 50/213; H01M 50/264; Y02E 60/10
See application file for complete search history.

(56) References Cited

U.S. PATENT DOCUMENTS

2011/0293986 A1* 12/2011 Kozu ................ H01M 10/6563
429/120
2020/0220132 A1 7/2020 Bourke

FOREIGN PATENT DOCUMENTS

| CN | 103296331 | 9/2013 |
|---|---|---|
| CN | 106299550 | 1/2017 |

(Continued)

OTHER PUBLICATIONS

"Notice of allowance of Europe Counterpart Application", issued on Sep. 10, 2024, p. 1-p. 7.

(Continued)

*Primary Examiner* — Lingwen R Zeng
(74) *Attorney, Agent, or Firm* — JCIP GLOBAL INC.

(57) ABSTRACT

A battery pack includes an insulating support, a liquid cooling tube, and at least two batteries. The insulating support includes a heat insulating portion. The heat insulating portion is located between adjacent two of the batteries. At least a part of an outer periphery of each battery is accommodated in the heat insulating portion. At least a part of the outer periphery of each battery exposed to an outside of the heat insulating portion is in contact with the liquid cooling tube.

13 Claims, 4 Drawing Sheets

(51) Int. Cl.
*H01M 10/659* (2014.01)
*H01M 50/213* (2021.01)
*H01M 50/264* (2021.01)

(56) References Cited

FOREIGN PATENT DOCUMENTS

| | | |
|---|---|---|
| CN | 106711542 | 5/2017 |
| CN | 213878199 | 8/2021 |
| CN | 113690510 | 11/2021 |
| CN | 114039127 | 2/2022 |
| CN | 216250870 | 4/2022 |
| CN | 217035794 | 7/2022 |
| DE | 102019114246 | 12/2019 |
| WO | 2018179734 | 10/2018 |

OTHER PUBLICATIONS

"Search Report of Europe Counterpart Application", issued on Jan. 17, 2023, p. 1-p. 9.
"Office Action of India Counterpart Application", issued on Aug. 8, 2025, p. 1-p. 6.
"Office Action of China Counterpart Application", issued on Sep. 3, 2025, pp. 1-6.

* cited by examiner

BATTERY PACK

CROSS-REFERENCE TO RELATED APPLICATION

This application claims the priority benefit of China application serial no. 202210399830.0, filed on Apr. 15, 2022. The entirety of the above-mentioned patent application is hereby incorporated by reference herein and made a part of this specification.

BACKGROUND

Technical Field

The disclosure relates to the technical field of batteries, and in particular to a battery pack.

Description of Related Art

In the related art, the battery needs to be liquid cooled to prevent the temperature of the battery from being too high. However, the distance between adjacent batteries is relatively short, and the heat transfer is relatively fast. Once a short circuit occurs, it is easy to cause thermal runaway.

SUMMARY

The disclosure provides a battery pack.

The disclosure provides a battery pack, which includes an insulating support, a liquid cooling tube, and at least two batteries. The insulating support includes a heat insulating portion. The heat insulating portion is located between adjacent two of the batteries. At least a part of an outer periphery of each battery is accommodated in the heat insulating portion. At least a part of the outer periphery of each battery exposed to an outside of the heat insulating portion is in contact with the liquid cooling tube.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DETAILED DESCRIPTION OF DISCLOSED EMBODIMENTS

Figure 1:
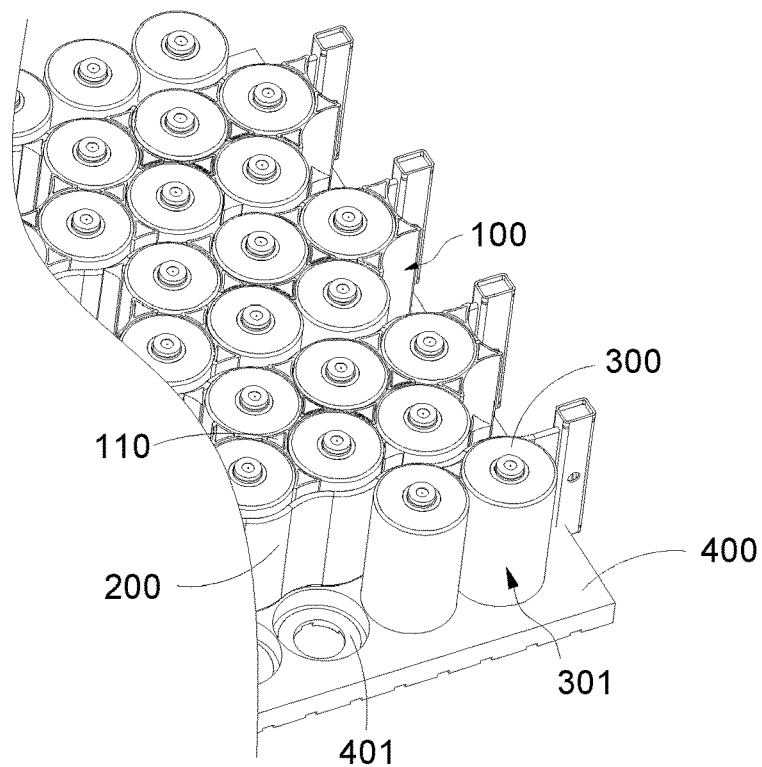
FIG. 1 is a schematic view of a partial structure of a battery pack provided in the embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

The embodiment provides a battery pack. Referring to the structures shown in FIG. 1 and FIG. 2, the battery pack provided in the embodiment includes an insulating support 100, a liquid cooling tube 200, and at least two batteries. The insulating support 100 includes a heat insulating portion 110. The heat insulating portion 110 is located between adjacent two of the batteries. At least a part of an outer periphery of each of the batteries is accommodated in the heat insulating portion 110. At least a part of the outer periphery of each of the batteries exposed to an outside of the heat insulating portion 110 is in contact with the liquid cooling tube 200.

In the battery pack provided in the embodiment, the insulating support 100 is provided, the heat insulating portion 110 of the insulating support 100 is located between two adjacent batteries, and the at least a part of the outer periphery of each of the batteries is accommodated in the heat insulating portion 110, so that the heat insulating capability between the batteries can be improved. At the same time, since at least a part of the outer periphery of the battery exposed to the outside of the heat insulating portion 110 is in contact with the liquid cooling tube 200, the liquid cooling effect of the liquid cooling tube 200 on the battery can be ensured.

It should be noted that, the liquid cooling tube 200 may be in direct contact with the outer periphery of the battery, and the liquid cooling tube 200 may also be in indirect contact with the outer periphery of the battery. For example, the liquid cooling tube 200 is in indirect contact and fixed with the outer periphery of the battery through gluing.

In an embodiment, each battery is a cylindrical battery 300. The outer periphery of the battery refers to a circumferential surface 301 of the cylindrical battery 300. Specifically, the circumferential surface 301 refers to an outer surface of the cylindrical battery 300 located between a top surface and a bottom surface thereof. The top surface and the bottom surface of the cylindrical battery 300 refer to two surfaces perpendicular to the axis of the cylindrical battery 300 and disposed opposite to each other. The circumferential surfaces 301 of two adjacent cylindrical batteries 300 and a part of the liquid cooling tube 200 facing a space between the two adjacent cylindrical batteries 300 form a cavity. Depending on different arrangements of the batteries, a cavity can be formed among the circumferential surfaces 301 of three cylindrical batteries 300, which form a triangle connected by three centers of circle thereof, and a cavity can also be formed between the circumferential surfaces 301 of four cylindrical batteries 300, which form a rectangle connected by four centers of circle thereof. The heat insulating portion 110 is disposed in the cavity. An outer surface of the heat insulating portion 110 may be in direct contact with the cylindrical battery 300 or may also be in indirect contact with the cylindrical battery 300. For example, the heat insulating portion 110 is in indirect contact and fixed with the cylindrical battery 300 through gluing.

In an embodiment, the heat insulating portion 110 includes a hollow columnar structure. The hollow columnar structure has an accommodating portion, and the at least part of the outer periphery of the battery is accommodated in the accommodating portion.

Figure 5:
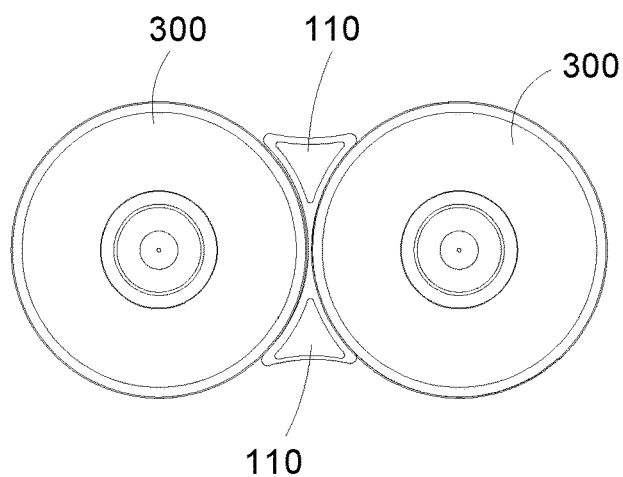
FIG. 5 is a schematic view of an insulating support matched with batteries in the embodiment.

Referring to FIG. 5, the hollow columnar structure is located between two adjacent batteries, and this configuration can further enhance the heat insulating effect between adjacent batteries to prevent thermal runaway.

The batteries are the cylindrical batteries 300. The hollow columnar structure is a hollow prismatic structure. The accommodating portion is a curved side surface 1111 of the hollow prismatic structure. The curved side surface 1111 is fittingly attached to the circumferential surface 301 of the cylindrical battery 300. At least a part of the circumferential surface 301 of the cylindrical battery 300 that is not in contact with the curved side surface 1111 can be in contact with the liquid cooling tube 200.

Since the circumferential surface 301 of the cylindrical battery 300 is an arc-shaped curved surface, in order to fittingly attach to the circumferential surface 301 of the cylindrical battery 300, the hollow columnar structure is the hollow prismatic structure, and the hollow prismatic structure has multiple curved side surfaces 1111. Exemplarily, depending on different arrangements of the cylindrical batteries 300, a contour shape of a region enclosed by the adjacent cylindrical batteries 300 is also different. For example, the contour shape of the region may be a curved triangle. Correspondingly, the hollow prismatic structure is a hollow triangular prismatic structure.

For another example, the contour shape of the region may also be a curved-sided quadrilateral. Correspondingly, the hollow prismatic structure is a hollow quadrangular prismatic structure.

It should be noted that, the hollow columnar structure is not limited to the hollow prismatic structure, and other forms of hollow columnar structures may also be selected according to a contour of gap between the batteries, as long as the heat insulating function between the batteries can be implemented.

Figure 4:
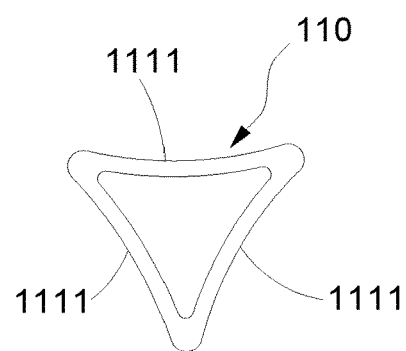
FIG. 4 is a main view of a hollow triangular prismatic structure in the embodiment.

In an embodiment, as shown in FIG. 4, the hollow prismatic structure is a hollow triangular prismatic structure. The hollow triangular prismatic structure has three curved side surfaces 1111, wherein at least two curved side surfaces 1111 are respectively and fittingly attached to the circumferential surfaces 301 of the two adjacent cylindrical batteries 300.

Figure 6:
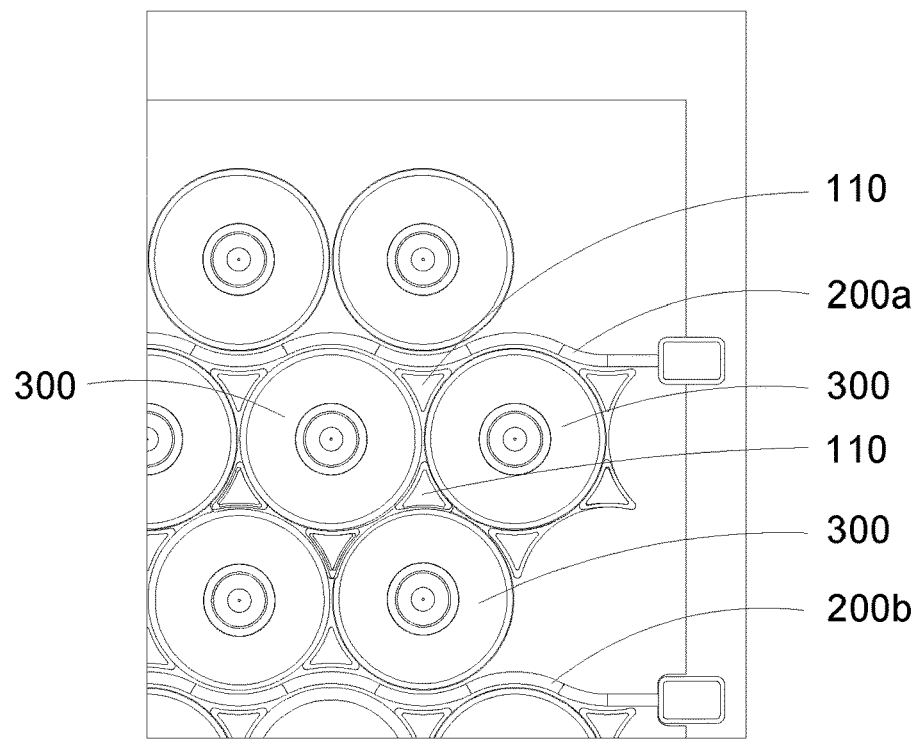
FIG. 6 is a top view of the battery pack provided in the embodiment.
Figure 7:
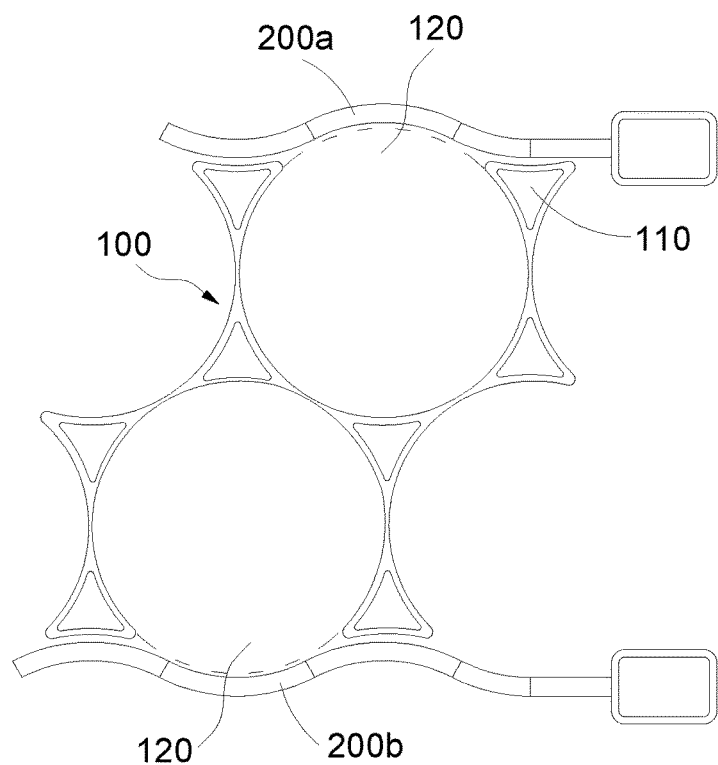
FIG. 7 is a schematic view of a structure of a heat insulating portion in the embodiment.

Specifically, the three curved side surfaces 1111 are all arc-shaped surfaces. Exemplarily, as shown in FIG. 6 and FIG. 7, the heat insulating portion 110 includes five hollow triangular prismatic structures. The five hollow triangular prismatic structures are connected in sequence to form an open ring structure. The opening of the open ring structure is an opening 120 of the insulating support 100. In the two adjacent cylindrical batteries 300, the open ring structure is sleeved on the outside of one of the cylindrical batteries 300. In other words, one of the cylindrical batteries 300 is located on the inside of the open ring structure, the other one of the cylindrical batteries 300 is located on the outside of the open ring structure, and at least a part of the hollow triangular prismatic structure in the open ring structure is located between the two adjacent cylindrical batteries 300.

In an embodiment, the number of the heat insulating portions 110 is at least two. The at least two heat insulating portions 110 are in contact with the same battery.

Referring to FIG. 5, the at least two heat insulating portions 110 are symmetrically disposed. The two heat insulating portions are located between two adjacent batteries. The curved side surfaces 1111 of the two heat insulating portions 110 are butted to form a circular arc-shaped recessed portion. At least part of the circumferential surface of the cylindrical battery is accommodated in the circular arc-shaped recessed portion.

In an embodiment, the insulating support 100 has the opening 120.

Figure 8:
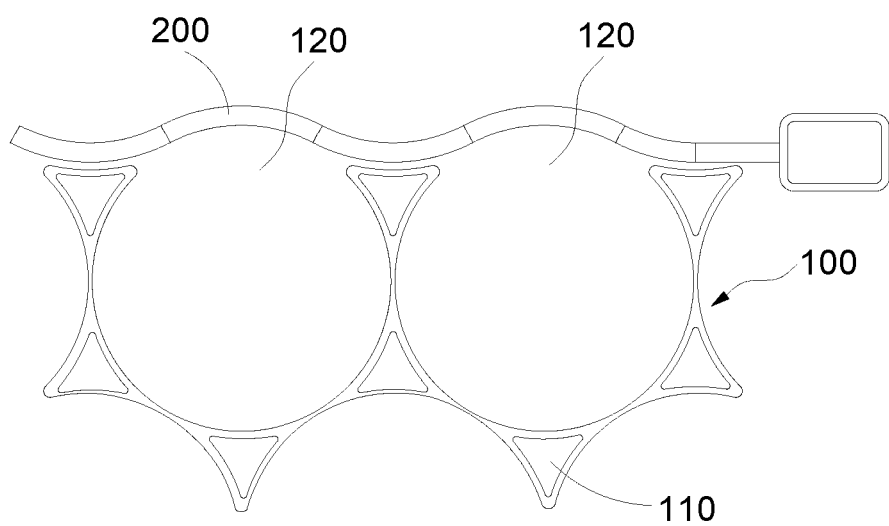
FIG. 8 is a schematic view of a structure of a modified example of the heat insulating portion in the embodiment.

Referring to FIG. 8, the insulating support 100 located at the outermost side of a battery bracket has at least one opening 120. The opening 120 is opposite to at least part of the circumferential surface 301 of the cylindrical battery 300. The opening 120 faces the liquid cooling tube 200. In other words, the circumferential surface 301 opposite to the opening 120 is exposed to the outside of the accommodating portion and is in contact with the liquid cooling tube 200 to implement liquid cooling.

In an embodiment, the number of the openings 120 is at least two. The insulating support 100 has a first side and a second side that are oppositely disposed, wherein one of the openings 120 is disposed on the first side, and another one of the openings 120 is disposed on the second side.

Exemplarily, the accommodating portion is located at two adjacent batteries, and the two openings 120 are disposed close to two farthest surfaces between the two adjacent batteries, which can not only implement heat insulation between the two adjacent batteries, but also satisfy liquid cooling of the battery by the liquid cooling tubes 200 located on two opposite sides of the battery.

In some embodiments, the batteries are the cylindrical batteries 300. The number of the liquid cooling tubes 200 is at least two. The two adjacent cylindrical batteries 300 are located between two adjacent liquid cooling tubes 200. The insulating support 100 has at least two openings 120, wherein one of the openings 120 faces one of the liquid cooling tubes 200, and another one of the openings 120 faces another one of the liquid cooling tubes 200. The longest distance between the end surfaces of the two openings 120 is the sum of the diameters of the two adjacent batteries.

Referring to FIG. 7, when two columns of batteries are disposed between the two adjacent liquid cooling tubes 200, the first side of the insulating support 100 is close to one of the liquid cooling tubes 200, and the second side of the insulating support 100 is close to the other one of the liquid cooling tubes 200. In this way, the two columns of batteries can all be in contact with the nearby liquid cooling tubes 200, such that the number of liquid cooling tubes is reduced, so as to reduce costs.

Specifically, the dotted line in FIG. 7 represents the end surface of the opening 120. The end surface of the opening 120 is a circular arc surface. The longest distance between the end surfaces of the two openings 120 refers to the longest distance between two circular arc surfaces.

Exemplarily, as shown in FIG. 1 and FIG. 6, two columns of placement grooves 401 are disposed between the two adjacent liquid cooling tubes 200, and the two columns of the placement grooves 401 are staggered. Batteries in the two columns of the placement grooves 401 are also staggered. Specifically, the two adjacent liquid cooling tubes 200 are respectively named a first liquid cooling tube 200a and a second liquid cooling tube 200b. Among the two columns of batteries, the column of batteries close to the first liquid cooling tube 200a are named first column batteries, and the column of batteries close to the second liquid cooling tube 200b are named second column batteries. Among the five hollow triangular prismatic structures, one of the hollow triangular prismatic structures is located in a region enclosed between the two adjacent cylindrical batteries 300 among the first column batteries and the first liquid cooling tube 200a. One of the curved side surfaces 1111 of the hollow triangular prismatic structure is fittingly attached to the outer tube wall of the first liquid cooling tube 200a. The other two curved side surfaces 1111 of the hollow triangular prismatic structure are respectively and fittingly attached to the circumferential surfaces 301 of the two adjacent cylindrical batteries 300.

Among the second column batteries, the cylindrical battery 300 corresponding to a position between the two adjacent cylindrical batteries 300 encloses a region with the two adjacent cylindrical batteries 300 among the first column batteries, and there is a hollow triangular prismatic structure disposed in the enclosed region. The three curved side surfaces 1111 of the hollow triangular prismatic structure are respectively and fittingly attached to the circumferential surfaces 301 of the three cylindrical batteries 300. This hollow triangular prismatic structure and the hollow triangular prismatic structure in the region enclosed between the two adjacent cylindrical batteries 300 among the first column batteries and the first liquid cooling tube 200a are integrally formed.

Exemplarily, as shown in FIG. 7, the number of hollow triangular prismatic structures is eight. The eight hollow triangular prismatic structures are divided into four groups. Each group includes two hollow triangular prismatic structures, and one edge of one of the hollow triangular prismatic structures is opposite and fixedly connected to one edge of the other one of the hollow triangular prismatic structures, that is, the two hollow triangular prismatic structures share one edge. The four groups of hollow triangular prismatic structures are staggered to form two open ring structures. One of the open ring structures is sleeved on the outside of one of the cylindrical batteries 300 adjacent to the first liquid cooling tube 200a, the other one of the open ring structures is sleeved on the outside of the other one of the cylindrical batteries 300 adjacent to the second liquid cooling tube 200b, and the other one of the cylindrical batteries 300 is adjacent to the one of the cylindrical batteries 300. The opening of the open ring structure is the opening 120 of the insulating support 100, which ensures that the circumferential surface 301 of the cylindrical battery 300 located at the opening 120 can be in contact with the liquid cooling tube 200. Specifically, the opening of one of the open ring structures faces the first liquid cooling tube 200a, so that the circumferential surface 301 of the cylindrical battery 300 can be fittingly attached to the first liquid cooling tube 200a, and the opening of the other one of the open ring structures faces the second liquid cooling tube 200b, so that the circumferential surface 301 of the cylindrical battery 300 can be fittingly attached to the second liquid cooling tube 200b. In this way, it is convenient to add adhesive between the cylindrical battery 300 and the liquid cooling tube 200, which improves the fixing effect of the cylindrical battery 300 and a liquid cooling device, reduces the amount of thermally conductive structural adhesive used, and implements heat insulation between the batteries to prevent thermal runaway.

Exemplarily, as shown in FIG. 8, the number of hollow triangular prismatic structures is eight. The eight hollow triangular prismatic structures are divided into five groups, wherein three groups respectively include two hollow triangular prismatic structures, and one edge of one of the hollow triangular prismatic structures is opposite and fixedly connected to one edge of the other one of the hollow triangular prismatic structures, that is, the two hollow triangular prismatic structures share one edge. The three groups of hollow triangular prismatic structures are arranged at intervals in the arrangement direction of the same column of batteries. Each of the other two groups includes one hollow triangular prismatic structure, and the two hollow triangular prismatic structures of these two groups are respectively connected between two adjacent groups of hollow triangular prismatic structures among the three groups of hollow triangular prismatic structures to form two side-by-side open ring structures. The two side-by-side open ring structures are respectively sleeved on the outside of the two adjacent cylindrical batteries 300 adjacent to the same liquid cooling tube 200. The openings of the two open ring structures face the same liquid cooling tube 200, so that the circumferential surfaces 301 of the two cylindrical batteries 300 can be fittingly attached to the same liquid cooling tube 200.

In some embodiments, multiple hollow triangular prismatic structures are integrally formed as one piece.

It should be noted that the number of the heat insulating portion 110 may be one.

It should be noted that, the two columns of the placement grooves 401 disposed between the two adjacent liquid cooling tubes 200 may also be arranged in rows and columns, that is, among the two columns of batteries, the cylindrical batteries 300 in one column correspond one-to-one to the cylindrical batteries 300 in the other column. Therefore, a region enclosed between the two adjacent cylindrical batteries 300 among one column and the two cylindrical batteries 300 at corresponding positions in the other column is a curved quadrilateral region. Correspondingly, the heat insulating portion 110 located in the curved quadrilateral region may also be a hollow quadrangular prismatic structure.

In addition, it should be noted that the specific structure and the arrangement manner of the heat insulating portions 110 are not limited to the several types above, and other forms of the heat insulating portions 110 and the arrangement manners thereof may also be selected according to actual production and processing requirements.

In an embodiment, the inside of the at least one hollow prismatic structure is provided with a phase change material.

When the battery generates a relatively large amount of heat, the phase change material can absorb heat, thereby dissipating heat from the battery. When the overall temperature of the battery pack is relatively low, the phase change material can release heat, thereby heating the battery to improve energy utilization efficiency.

In an embodiment, the liquid cooling tube 200 is bonded and fixed to the batteries, the batteries are bonded and fixed to the heat insulating portion 110, and the heat insulating portion 110 is bonded and fixed to the liquid cooling tube 200.

When the batteries, the insulating support 100, and the liquid cooling tube 200 are glued and fixed through adhesive filling, since the heat insulating portion 110 is located between two adjacent batteries, a large amount of glue can be effectively prevented from flowing to a cavity between the two adjacent batteries to ensure that the glue can be filled in gaps between the liquid cooling tube 200, the batteries, and the heat insulating portion 110, which reduces the amount of glue used, thereby reducing the overall weight, so that the energy density of the battery pack can be effectively improved.

Exemplarily, the glue is a conventional thermally conductive structural adhesive.

In an embodiment, the battery pack further includes a battery bracket 400. The batteries and the insulating support 100 are both located on the battery bracket 400. The material of the battery bracket 400 is an insulating material to ensure the safety of the battery pack.

For example, the material of the battery bracket 400 is plastic.

In an embodiment, the battery bracket 400 is provided with the placement groove 401. The batteries are fixedly installed in the placement groove 401.

Exemplarily, the shape of the cross-section of the placement groove 401 is circular to fit the circumferential surface 301 of the cylindrical battery 300. An upper surface of the battery bracket 400 is provided with multiple columns of the placement grooves 401. The columns of the placement grooves 401 are arranged in parallel and at intervals. Each column of the placement grooves 401 includes multiple placement grooves 401. Exemplarily, two adjacent columns of the placement grooves 401 are staggered. In this way, the battery bracket 400 can be fully utilized, and more batteries can be placed on the battery bracket 400.

In an embodiment, the liquid cooling tube 200 is a serpentine flat tube. The serpentine flat tube can liquid-cool the cylindrical battery 300. Exemplarily, the serpentine flat tube is disposed between the two adjacent columns of the placement grooves 401, so that the serpentine flat tube can liquid-cool the cylindrical batteries 300 located on both sides thereof at the same time.

Exemplarily, the number of serpentine flat tubes is multiple. The serpentine flat tubes are arranged in parallel and at intervals. There may be one column of the placement grooves 401 or there may be two columns of the placement grooves 401 between two adjacent serpentine flat tubes. In this way, each serpentine flat tube can also be ensured to liquid cool the cylindrical batteries 300 located on both sides thereof at the same time.

In an embodiment, each battery is the cylindrical battery 300. A contact area between the liquid cooling tube 200 and the circumferential surface 301 of the cylindrical battery 300 is greater than ¼ of the circumferential surface area of the cylindrical battery 300 and smaller than ½ of the circumferential surface area of the cylindrical battery 300.

Specifically, if the contact area between the serpentine flat tube and the circumferential surface 301 of the cylindrical battery 300 is too large, the circumferential surface 301 of the cylindrical battery 300 for being in contact with the heat insulating portion 110 will be too small, thereby causing the strength of connection between the heat insulating portion 110 and the cylindrical battery 300 to be reduced. If the contact area between the serpentine flat tube and the circumferential surface 301 of the cylindrical battery 300 is too small, the liquid cooling effect of the serpentine flat tube on the cylindrical battery 300 will be relatively poor.

Therefore, in the embodiment, the contact area between the serpentine flat tube and the circumferential surface 301 of the cylindrical battery 300 is greater than ¼ of the circumferential surface area of the cylindrical battery 300 and is less than ½ of the circumferential surface area of the cylindrical battery 300.

Exemplarily, the contact area between the serpentine flat tube and the circumferential surface 301 of the cylindrical battery 300 may be ⅓ of the circumferential surface area of the cylindrical battery 300.

Exemplarily, the contact area between the serpentine flat tube and the circumferential surface 301 of the cylindrical battery 300 may be ⅖ of the circumferential surface area of the cylindrical battery 300.

It should be noted that the serpentine flat tube and the cylindrical battery 300 may be in direct contact or indirect contact. For example, the serpentine flat tube and the cylindrical battery 300 may be in indirect contact and fixed through a thermally conductive structural adhesive.

Figure 2:
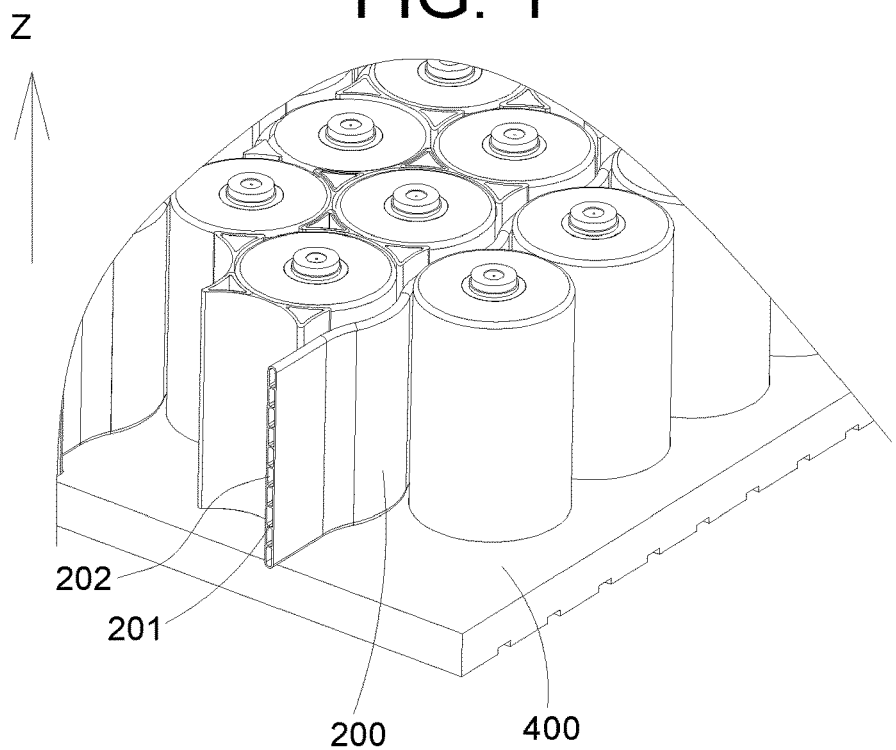
FIG. 2 is a schematic view of a partial structure of the battery pack provided in the embodiment from another perspective.

In some embodiments, a partition 201 is disposed in the liquid cooling tube 200. The extending direction of the partition 201 is substantially the same as the extending direction of a liquid cooling plate. The partition 201 divides an inner cavity of the liquid cooling tube 200 into multiple liquid cooling channels 202. Exemplarily, as shown in FIG. 2, the number of the partitions 201 is nine. The nine partitions 201 divide the inner cavity of the liquid cooling tube 200 into ten liquid cooling channels 202. The ten liquid cooling channels 202 are arranged at intervals along the height direction of the insulating support 100. Such configuration can ensure a larger contact area between a liquid cooling medium and the battery, so as to prevent the issue that the liquid cooling medium can only cool the bottom of the battery under the action of gravity.

Referring to FIG. 2, an arrow direction Z indicates the height direction of the battery pack. When the liquid cooling tube 200 liquid cools a column of batteries in the battery pack, the plurality of liquid cooling channels 202 can perform liquid cooling to different positions of the same battery, so as to ensure that each battery can obtain relatively uniform liquid cooling.

In some embodiments, the flow directions of the liquid cooling media in the liquid cooling channels 202 are the same.

Figure 3:
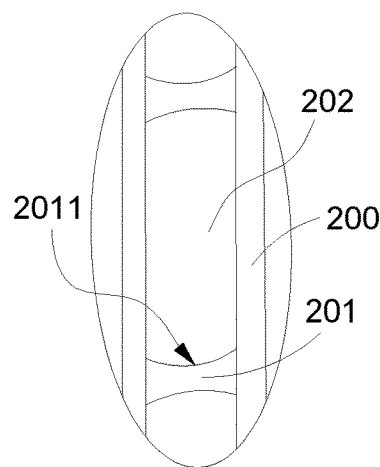
FIG. 3 is a schematic view of an internal structure of a liquid cooling tube in the battery pack provided in the embodiment.

In some embodiments, as shown in FIG. 3, two opposite plate surfaces of the partition 201 are both arc-shaped surfaces 2011. The bending directions of the two arc-shaped surfaces 2011 are opposite to each other. In other words, one of the arc-shaped surfaces 2011 is bent toward the direction adjacent to the other one of the arc-shaped surfaces 2011, such configuration enables smooth transition of an inner wall of the liquid cooling channel 202, thereby reducing the flow resistance of the liquid cooling medium, while alleviating the impact of the liquid cooling medium on the liquid cooling tube 200 and causing less damage to the liquid cooling tube 200.

In some embodiments, the material of the liquid cooling tube 200 is metal. An outer surface of the liquid cooling tube 200 is provided with a thermally conductive buffer pad.

The liquid cooling tube 200 made of metal can improve the liquid cooling effect. Through disposing the thermally conductive buffer pad on the outer surface of the liquid cooling tube 200, there can be buffer with the battery to prevent damage to the battery under the premise of ensuring the liquid cooling effect.

It should be noted that the battery in the embodiment may also be a square battery. An outer periphery of the square battery refers to a surface perpendicular to a top plate of a casing of the battery pack.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery pack, comprising an insulating support, a liquid cooling tube, and at least two batteries, wherein the insulating support comprises a heat insulating portion, the heat insulating portion is located between adjacent two of the batteries, at least a part of an outer periphery of each battery is accommodated in the heat insulating portion, and at least a part of the outer periphery of each battery exposed to an outside of the heat insulating portion is in direct contact with the liquid cooling tube,
   wherein the liquid cooling tube is bonded and fixed to the batteries, the batteries are bonded and fixed to the heat insulating portion, and the heat insulating portion is bonded and fixed to the liquid cooling tube,
   each battery is a cylindrical battery, and a contact area between the liquid cooling tube and a circumferential surface of the cylindrical battery is greater than ¼ of a circumferential surface area of the cylindrical battery and is less than ½ of the circumferential surface area of the cylindrical battery.

2. The battery pack according to claim 1, wherein a number of the heat insulating portions is at least two, and the at least two heat insulating portions are in contact with a same one of the batteries.

3. The battery pack according to claim 2, wherein the at least two heat insulating portions are symmetrically disposed.

4. The battery pack according to claim 1, wherein the insulating support has an opening.

5. The battery pack according to claim 4, wherein a number of the openings is at least two; and the insulating support has a first side and a second side that are oppositely disposed, wherein one of the openings is disposed on the first side, and other one of the openings is disposed on the second side.

6. The battery pack according to claim 1, wherein the heat insulating portion comprises a hollow columnar structure, the hollow columnar structure has an accommodating portion, and the at least a part of the outer periphery of each battery is accommodated in the accommodating portion.

7. The battery pack according to claim 6, wherein the hollow columnar structure is a hollow prismatic structure, the accommodating portion is a curved side surface of the hollow prismatic structure, and the curved side surface is fittingly attached to the circumferential surface of the cylindrical battery.

8. The battery pack according to claim 7, wherein the hollow prismatic structure is a hollow triangular prismatic structure, and the hollow triangular prismatic structure has three curved side surfaces, at least two of the curved side surfaces are respectively and fittingly attached to the circumferential surfaces of adjacent two of the cylindrical batteries.

9. The battery pack according to claim 6, wherein an inside of the hollow columnar structure is provided with a phase change material.

10. The battery pack according to claim 1, wherein a number of the liquid cooling tubes is at least two, and the adjacent two of the cylindrical batteries is located between adjacent two of the liquid cooling tubes; the insulating support has at least two openings, wherein one of the openings faces one of the liquid cooling tubes, and other one of the openings faces other one of the liquid cooling tubes; and a longest distance between end surfaces of the at least two openings is a sum of diameters of the adjacent two of the cylindrical batteries.

11. The battery pack according to claim 1, further comprising a battery bracket, wherein the batteries and the insulating support are both located on the battery bracket.

12. The battery pack according to claim 11, wherein the battery bracket is provided with a placement groove, and the batteries is fixedly installed in the placement groove.

13. The battery pack according to claim 1, wherein a partition is disposed in the liquid cooling tube, the partition divides an inner cavity of the liquid cooling tube into a plurality of liquid cooling channels, and the liquid cooling channels are arranged at intervals along a height direction of the battery pack.

* * * * *